United States Patent
Avrahami

(10) Patent No.: US 9,465,470 B2
(45) Date of Patent: Oct. 11, 2016

(54) CONTROLLING PRIMARY AND SECONDARY DISPLAYS FROM A SINGLE TOUCHSCREEN

(71) Applicant: Intel Corporation, Santa Clara, CA (US)

(72) Inventor: Daniel Avrahami, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,781

(22) PCT Filed: Nov. 7, 2013

(86) PCT No.: PCT/US2013/068928
§ 371 (c)(1),
(2) Date: Dec. 27, 2013

(87) PCT Pub. No.: WO2015/069259
PCT Pub. Date: May 14, 2015

(65) Prior Publication Data
US 2015/0220182 A1 Aug. 6, 2015

(51) Int. Cl.
*G06F 3/041* (2006.01)
*G06F 3/0354* (2013.01)
(Continued)

(52) U.S. Cl.
CPC .............. *G06F 3/0412* (2013.01); *G06F 3/038* (2013.01); *G06F 3/03543* (2013.01);
(Continued)

(58) Field of Classification Search
CPC ........... G06F 3/04886; G06F 3/04883; G06F 3/0237; G06F 2203/04808; G06F 3/0416; G06F 3/0488; G06F 17/273; G06F 17/276; G06F 17/30038; G06F 1/1616; G06F 1/1641; G06F 3/041; G06F 3/0481; G06F 3/0483; G06F 17/2294; G06F 17/301; G06F 17/3012
See application file for complete search history.

(56) References Cited

U.S. PATENT DOCUMENTS

2010/0060572 A1 3/2010 Tsern
2010/0259491 A1 10/2010 Rajamani et al.
(Continued)

FOREIGN PATENT DOCUMENTS

WO WO-2009049331 A2 4/2009
WO WO-2015069259 A1 5/2015

OTHER PUBLICATIONS

"International Application Serial No. PCT/US2013/068928, International Search Report mailed Aug. 13, 2014", 3 pgs.
(Continued)

*Primary Examiner* — Md Saiful A Siddiqui
(74) *Attorney, Agent, or Firm* — Schwegman Lundberg & Woessner, P.A.

(57) ABSTRACT

Various systems and methods for controlling primary and secondary displays from a single touchscreen are described herein. An apparatus comprises a touchscreen display, a processor communicatively coupled to the touchscreen display, a detection module communicatively coupled to the processor, and a control module communicatively coupled to the processor. The detection module detects a particular configuration of a plurality of contact points occurring concurrently on the touchscreen display and detects a touch interaction sequence after detecting the particular configuration of the plurality of contact points. The control module controls a pointer on the secondary display based on the touch interaction sequence.

15 Claims, 6 Drawing Sheets

(51) Int. Cl.
    *G06F 3/0488* (2013.01)
    *G06F 3/14* (2006.01)
    *G06F 3/038* (2013.01)
(52) U.S. Cl.
    CPC ........ *G06F 3/03547* (2013.01); *G06F 3/0488* (2013.01); *G06F 3/04883* (2013.01); *G06F 3/1423* (2013.01); *G06F 2203/04808* (2013.01)

(56) References Cited

U.S. PATENT DOCUMENTS

| | | | | |
|---|---|---|---|---|
| 2010/0302144 | A1* | 12/2010 | Burtner et al. | 345/157 |
| 2011/0102570 | A1* | 5/2011 | Wilf et al. | 348/77 |
| 2011/0205163 | A1* | 8/2011 | Hinckley et al. | 345/173 |
| 2011/0205169 | A1 | 8/2011 | Yasutake | |
| 2011/0310030 | A1 | 12/2011 | Mundt et al. | |
| 2012/0081299 | A1* | 4/2012 | Xiao et al. | 345/173 |
| 2012/0229406 | A1* | 9/2012 | Wu | 345/173 |
| 2012/0229410 | A1* | 9/2012 | Ohashi | 345/173 |
| 2012/0235912 | A1* | 9/2012 | Laubach | 345/163 |
| 2014/0306897 | A1* | 10/2014 | Cueto | 345/173 |

OTHER PUBLICATIONS

"International Application Serial No. PCT/US2013/068928, Written Opinion mailed Aug. 13, 2014", 7 pgs.

* cited by examiner

CONTROLLING PRIMARY AND SECONDARY DISPLAYS FROM A SINGLE TOUCHSCREEN

CROSS-REFERENCE TO RELATED APPLICATION(S)

This application is a U.S. National Stage Application under 35 U.S.C. §371 from International Application No. PCT/US2013/068928, filed Nov. 7, 2013, which is hereby incorporated by reference in its entirety.

TECHNICAL FIELD

Embodiments described herein generally relate to input devices and in particular, to a system and method for controlling primary and secondary displays from a single touchscreen.

BACKGROUND

In computing, an input device includes any hardware equipment used to provide data or control signals to a computing device, such as a computer. Examples of input devices include keyboards, mice, scanners, digital cameras, joysticks, motion detectors, and touchpads.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In many mobile devices, conventional input devices such as keyboards and mice have been replaced by a touchscreen interface. Using a touchscreen is intuitive and relatively straightforward. Various gestures have been implemented to allow users to interact with the graphical user interface presented on a touchscreen interface. Some gestures include selecting items with a tap or moving items with a tap and drag. Other gestures include multiple fingers (or contact points), such as a two finger rotate, a two finger zoom, a four finger swipe, or a five finger pinch. These multi-finger gestures perform intuitive actions, such as rotating a picture with a two finger rotate gesture or magnifying a document view with a two finger zoom gesture. Many other gestures may be available to a user for a particular touchscreen interface.

However, when a touchscreen device, such as a tablet computer, is used with an additional display device such that the touchscreen's display is extended to the other display device, a problem arises. With the touchscreen as the only input device available, there is no mechanism immediately available to control a pointer on the extended display. What is needed is an intuitive mechanism to control a pointer on a secondary display from a display of a touchscreen-enabled device. Embodiments described herein illustrate a mechanism that allows a user to rapidly switch between direct manipulation of the touchscreen user interface and control of a pointer on a secondary display without disrupting workflow. In an embodiment, to control the secondary display, a user places her hand on the touchscreen as if she was holding a mouse. This particular hand configuration is identified through the touch contacts with the touchscreen and the touchscreen-enabled device controls the pointer on the secondary display using, for example, event messaging.

Figure 1A:
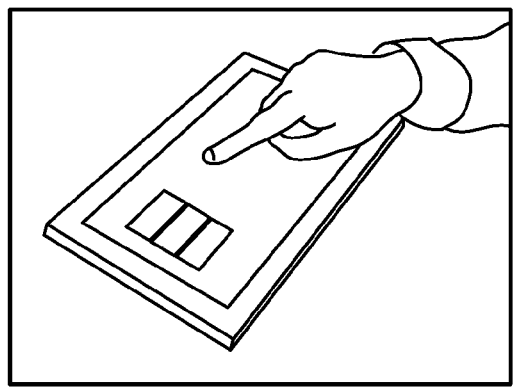
FIGS. 1A-C illustrate hand positions on a touchscreen, according to example embodiments.
Figure 1B:
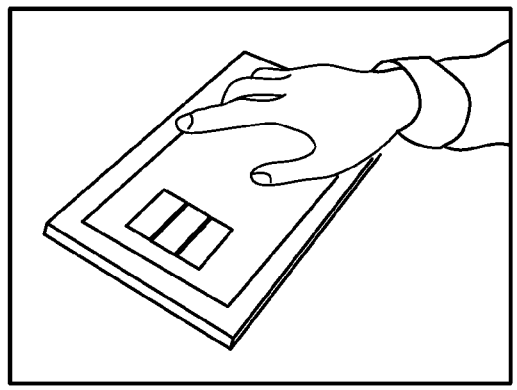
Figure 1C:
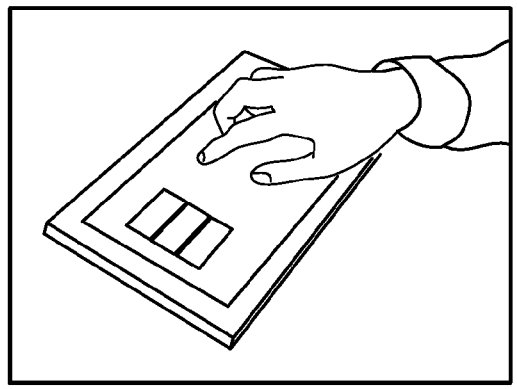

FIGS. 1A-C illustrate hand positions on a touchscreen, according to example embodiments. In FIG. 1A, the user is shown interacting with the touchscreen using one finger (index finger). The single-finger gesture may be used to select, activate, move, or otherwise manipulate user interface controls on the touchscreen. In FIG. 1B, the user is shown using a hand configuration that simulates holding a mouse. In FIG. 1B, four fingers are contacting the touchscreen: the thumb, middle finger, ring finger, and pinky finger. The index finger is elevated in FIG. 1B. While in this position, when the user moves the hand configuration around the touchscreen while maintaining contact, a pointer is moved on a secondary display—similar to as if the user were using a mouse to move the pointer. In FIG. 1C, the user's hand is illustrated with the index finger down creating a contact point. In this figure, the hand configuration simulates the position when holding a mouse and clicking a mouse button. When used in conjunction with the embodiments described herein, a mouse down event may be reflected in the secondary display to select, activate (e.g., execute a program with a double click), or move (e.g., with a click and drag).

While pointing interactions in FIG. 1A on the touchscreen follow an "absolute pointer" paradigm, pointing on the secondary display follows a "relative pointer" paradigm. The pointer interactions on the secondary display may include typical mouse activities, such as moving the pointer, clicking, dragging, or scrolling.

Additionally, when a user runs out of space on the touchscreen display to move the pointer, the user may pick up her hand and move it to a different portion of the touchscreen display and with the correct hand configuration, continue moving the pointer on the secondary display. This activity is similar to what a user may have to do when running out of room on a desk with a real mouse.

A pointer or mouse cursor is a graphical image presented on a display device that indicates a current point of focus. When combined with an input action, such as a mouse click or a simulated mouse click, the pointer may be used to select, activate, or move user interface elements (e.g., icons, text, images, cursors, etc.).

When an input is detected, such as a contact with a touchscreen or a click or motion with a pointing device (e.g., a mouse), an event is generated. The event may be used to initiate other actions or processes. Event-driven programming and environments use events to control programmatic responses. In this document events are described with respect to a contact or set of contacts with a touchscreen input device. The contact or set of contacts may be interpreted as a gesture. The contact may be referred to by an event name or category, such as mouse down (e.g., contact initiated), mouse up (e.g., contact terminated), mouse move, or the like. Although some examples may use terminology in the context of mouse events, it is understood that any type of event caused by an actuation of an input device may be used.

Using a gesture as illustrated in FIGS. 1A-C ensures that the user is allowed to transition between input modes quickly and intuitively. As discussed above, some touchscreen devices allow for four and five-finger gestures. In these situations, a timeout may be used to distinguish the mouse-hand configuration from another four-finger gesture. For example, a user may rest their hand in a mouse-hand configuration in a relatively still position for more than a threshold period (e.g., 0.5 seconds) in order to activate the pointer control mode. In this manner, the four-finger mouse-hand gesture may be distinguished from a four-finger swipe to change applications, for example.

In an embodiment, an audible, visual, or tactile cue may be used to inform the user that the control has switched from direct input on the touchscreen to controlling a pointer on a secondary display. For example, a sound may be played during a control change, the pointer may be highlighted on the secondary display, or the touchscreen device may vibrate to indicate a control change. Combinations of audible, visual, or tactile cues may be used. Additionally, the cue or cues may be configurable by a user (e.g., selecting the alert sound or volume, selecting which cues are used when, or selecting duration of a cue).

Figure 2:
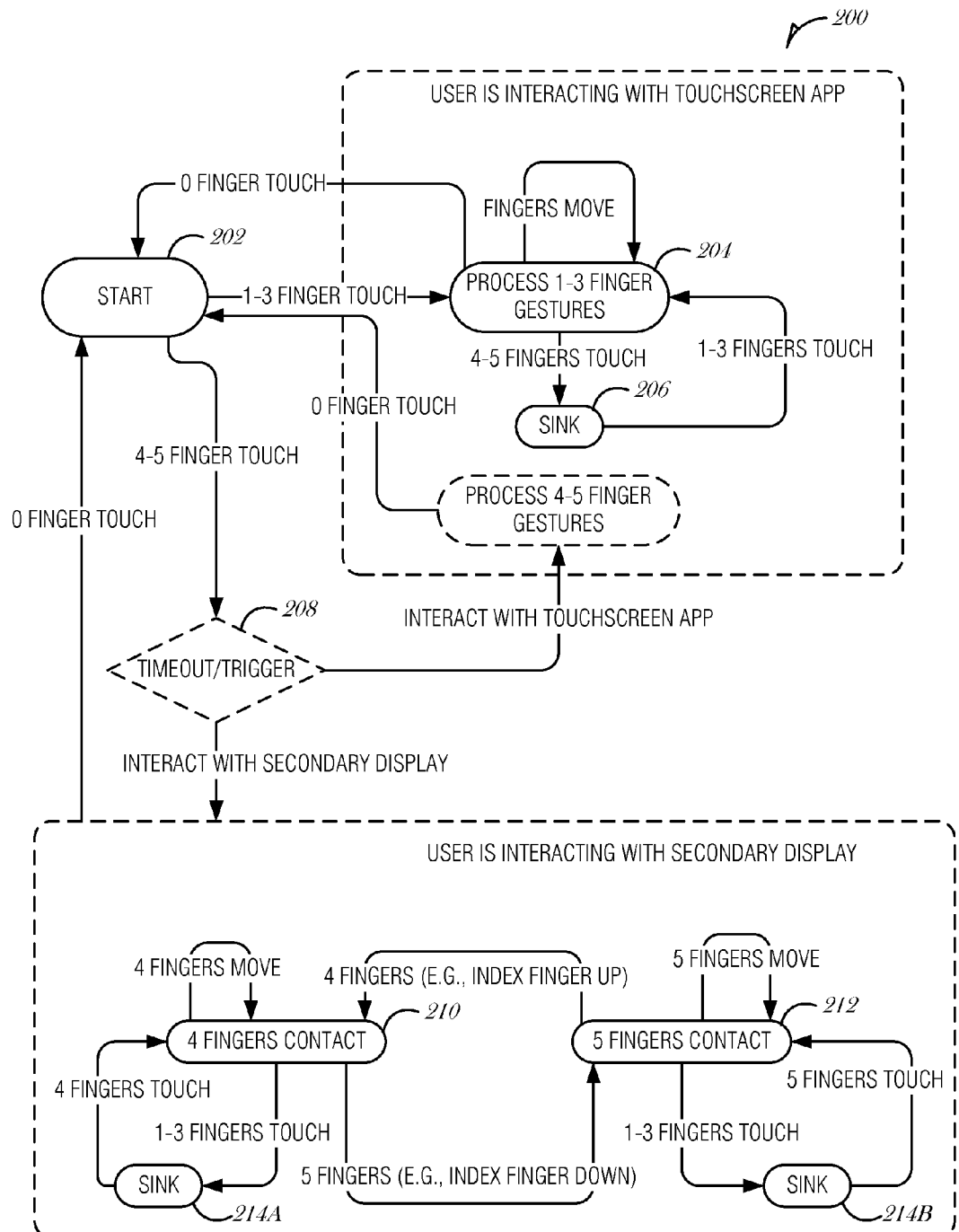
FIG. 2 is a state diagram illustrating system logic, according to an example embodiment.

FIG. 2 is a state diagram 200 illustrating system logic, according to an example embodiment. The initial default state (block 202) is with no fingers touching the touchscreen. This state is entered whenever the user is not touching the screen. In an embodiment, it is the only state that allows the user to transition between interacting with elements on the touchscreen and interacting with elements on the secondary display.

When a user touches the touchscreen with one to three fingers, the 1-3 finger gestures are processed (block 204). Examples of 1-3 finger gestures include, but are not limited to tapping, tap and hold, tap and drag, pinch, rotate, pan, scroll, or swipe. Such gestures are processed as taps, movements, or combinations of taps and movements. The gesture processing ends when all fingers are lifted from the touchscreen (return to default state 202). If during processing of a 1-3 finger gesture (block 204), additional contact points are made, they are ignored. For example, if the user touches the screen with additional fingers (e.g., fingers four or five from one hand), then no events are delivered until either the user resumes a 1-3 finger touch gesture or the user lifts all fingers (0 finger touch). When additional fingers greater than the 1-3 fingers used in a gesture are detected, the state diagram 200 enters a sink 206 where no touch commands are processed. Alternatively, when extra touches are detected, a previously-initiated gesture may continue. For example, if a user is zooming/shrinking with a two-finger touch pinch gesture and accidentally touches the screen with a third or fourth finger, the zooming/shrinking gesture may continue to operate on the initial two touch points and ignore the additional touch points.

From the default state 202, if the user touches the touchscreen with four or five fingers, then a timeout/trigger (block 208) is optionally used to determine the intent of the user. The timeout/trigger 208 may be used in systems where a four or five-finger touch gesture is available. For example, when a system provides for a four-finger swipe gesture to switch applications, this four-finger gesture needs to be distinguished from the four-finger gesture designed to operate a secondary display. Thus, in an embodiment, a timeout/trigger determination is used. The timeout may be a delay period, such as 0.5 seconds, where the user places four fingers on the touchscreen and remains relatively stationary for the delay period. Using a timeout, if the user wishes to change applications, a four-finger gesture of placing the fingers on the touchscreen and then swiping relatively immediately afterwards is distinguishable from a gesture used to control a separate display.

In another embodiment, a trigger determination may be used. The trigger may be a certain arrangement, orientation, or configuration of contact points, such as in a position that would emulate holding a mouse. Using this particular finger/hand position, the user's intent may be inferred and the control of the secondary display may be initiated. The particular finger/hand configuration may be configured by the user. For example, the user may cause the touchscreen device to enter a learning mode and then place their hand in a mouse-hand configuration. The touchscreen device may then associate the user's touch points with a mouse-hand configuration such that at a later time, when the user places her hand in the pre-determined position, the mode for pointer control on a secondary display is initiated.

If the touchscreen-enabled device does not support four or five finger gestures, then the timeout/trigger determination 202 may be unnecessary and may not be used. However, in some cases, the timeout/trigger mechanism may still be used even when other four or five finger gestures are not supported in order to maintain a consistent user interface and implementation between various platforms.

When the user touches the touchscreen in a way to pass the timeout/trigger determination (if there is one), then the touch interaction sequence is directed to the secondary display. Initially, the user may be in the four-fingers contact state (block 210). If the user moves their hand on the screen then a move event is directed to the secondary display to move the pointer. If the user puts a fifth finger on the touchscreen, such as an index finger, then the logic flows to the five-fingers contact state (block 212). Lifting the fifth finger will return the process to the four-finger contact state (block 210). Touching and lifting the fifth finger (in quick succession) may result in a tap interaction sequence, whereas adding the fifth finger (e.g., tap and hold) may result in a tap and drag interaction sequence. Other gestures may be used in a four and five-finger interaction sequence. For example, the tap and drag with an index finger is similar to a motion used to actuate a scroll wheel on a physical mouse. In an embodiment, a tap and drag with the fifth finger may result in a scrolling gesture.

In the five-finger contact state (block 212), when a user moves the contact points, then a move event may be directed to the secondary display. In an example, the five-finger move is considered a select and move sequence (e.g., to select a file and drag it from one folder to another folder).

In either the four-finger contact state (block 210) of the five-finger contact state (block 212), lifting fingers may result in the logic moving to a sink state (block 214A, 214B), where touch processing is suspended. Alternatively, lifting of fingers may be ignored and the previous gesture processing may be continued (where at least one finger remains in contact). For example, when a user has four fingers in contact and is moving the pointer around on the secondary display, if the user lifts a finger or two from contact, the process flow may continue to move the pointer as if the user still had four fingers in contact.

From either the four-finger contact state (block 210) of the five-finger contact state (block 212), when the user removes all fingers from contact with the touchscreen, the process flow returns to the initial default state (block 202).

It is understood that various event messages may be initiated or communicated at various points in the state diagram 200. For example, when moving from the initial default state (block 202) to the 1-3 fingers down state (block 204), an operating system level event message may be generated to indicate the start of a touch interaction sequence. Similarly, as a user moves their finger(s) while interacting with the touchscreen, various event messages may be generated to indicate that the touches moved and in what manner (direction, velocity, pressure, etc.). When operating to interact with the secondary display, mouse events may be generated and transmitted to an application controlling the pointer on the secondary display.

Figure 3:
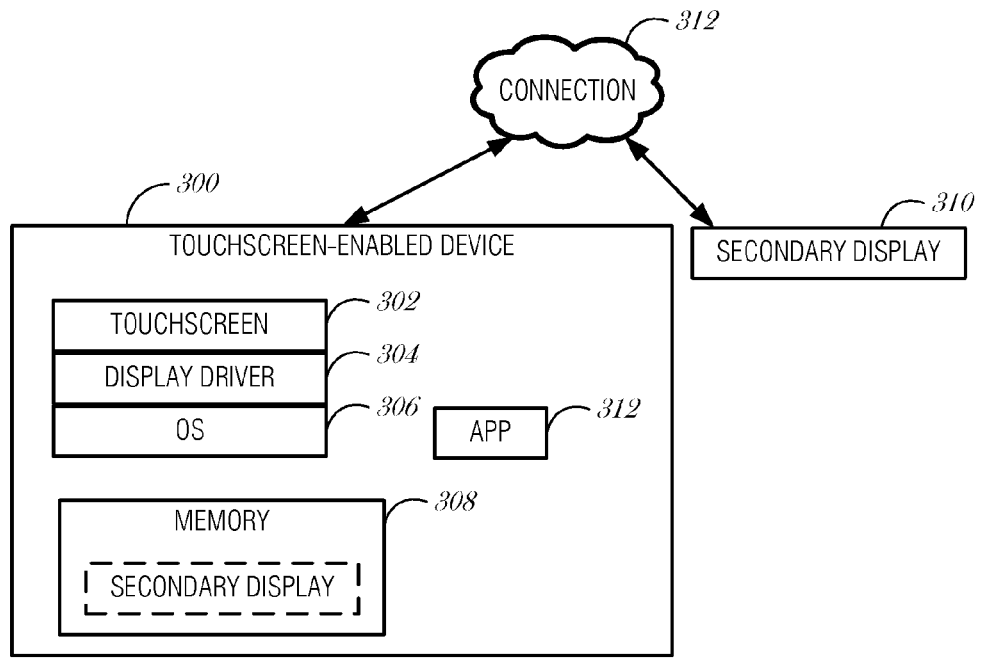
FIG. 3 is a schematic of a computer architecture of a touchscreen-enabled device, according to an example embodiment.

FIG. 3 is a schematic of a computer architecture of a touchscreen-enabled device 300, according to an example embodiment. The touchscreen-enabled device 300 includes a touchscreen 302, a display driver 304, and an operating system 306. The operating system 306 receives input and provides output via the touchscreen 302. The display driver 304 operates with the operating system 306 to produce the display on the touchscreen 302. The display driver 304 has access to memory 308. The memory 308 may be system memory (e.g., random access memory (RAM)) or dedicated memory, such as video memory (e.g., VRAM). The touchscreen-enabled device 300 is connected to a secondary display 310 over a connection 312. The connection 312 may be any kind of connection including physical or wireless connections. In various embodiments, the connection 312 includes a wireless network including, but not limited to wireless display (WiDi) technology, Bluetooth®, IEEE 802.11, Wi-Fi™, or other personal area networks or wireless local area networks. In other embodiments, the connection 312 includes a universal serial bus (USB), high-definition multimedia interface (HDMI), video graphics array (VGA), or digital visual interface (DVI) connection.

In the embodiment illustrated in FIG. 3, the secondary display 310 may be memory mapped to the memory 308 such that the display driver 304 is able to update and manage the presentation on the secondary display 310. In order to present the image, the touchscreen-enabled device 300 transmits a video signal to the secondary display 310 over the connection 312. In this configuration, an application 312 executing on the touchscreen-enabled device 300 is displayed on the secondary display 310 (e.g., extended display) where pointer input to the application 312 being displayed on the secondary display 310 is implemented with a special gesture (e.g., a mouse-hand configuration). The application 312 may be programmed to detect a mouse-like event, such as that generated when the user interacts with the touchscreen-enabled device 300 with a mouse-hand configuration. The application 312 may then respond to the mouse-like event, such as by way of activating a user interface element or executing a process or subprocess. The application 312 in conjunction with the operating system 306 and display driver 304 may control the output presentation of the pointer on the secondary display 310. For other applications that are presented on the touchscreen 302, the user may use typical gesture input.

Figure 4:
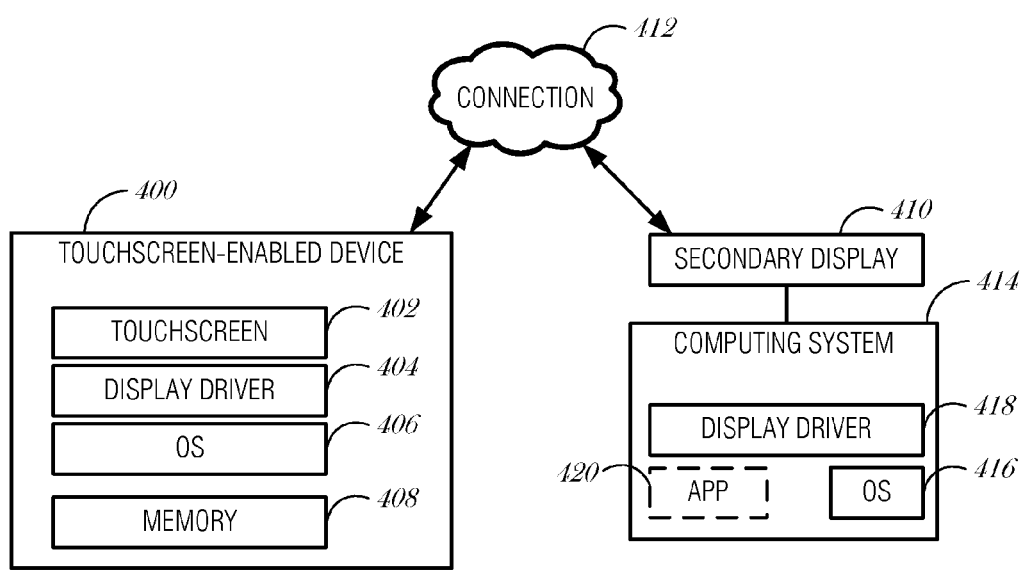
FIG. 4 is a schematic of a computer architecture of a touchscreen-enabled device, according to an example embodiment.

FIG. 4 is a schematic of a computer architecture of a touchscreen-enabled device 400, according to an example embodiment. Similar to the configuration in FIG. 3, the touchscreen-enabled device 400 includes a touchscreen 402, a display driver 404, an operating system 406, and a memory 408. However, in FIG. 4, the secondary display 410 is part of a separate computing system 414 with an operating system 416 and a display driver 418. In this configuration, the operating system 416 and display driver 418 are used to present information on the secondary display 410. In particular, the operating system 416 and display driver 418 are used to display and update a pointer on the secondary display 410. Thus, in the embodiment illustrated in FIG. 4, when a user operates the touchscreen-enabled device 400 to move the pointer on the secondary display 410, instead of transmitting a video signal to the secondary display 410 via the connection 412, event messages are transmitted. For example, a standardized event message for various mouse movements or actions may be transmitted from the touchscreen-enabled device 400 to the operating system 416 of the secondary display 410. Examples may be a mouse_down, mouse_up, mouse_move, mouse_scroll, or mouse_click event or other types of events. Event names and parameters may differ based on the operating system.

Instead of transmitting the event messages to the operating system 416, an application 420 may be installed on the computing system. The application 420 may receive mouse event messages and update the pointer position or actions based on the messages. The application 420 may be any of a variety of applications, such as a multimedia presentation application (e.g., movie player or slideshow player), an entertainment application (e.g., a game), or a utility application (e.g., a word processor, email, or office work application).

Thus, in the embodiment illustrated in FIG. 4, a user is able to control applications presented on the touchscreen-enabled device 400 with typical gestures and then control applications presented on the secondary display 410 with special gestures (e.g., a mouse-hand configuration). Switching control between the two is quick, easy, and intuitive.

Figure 5:
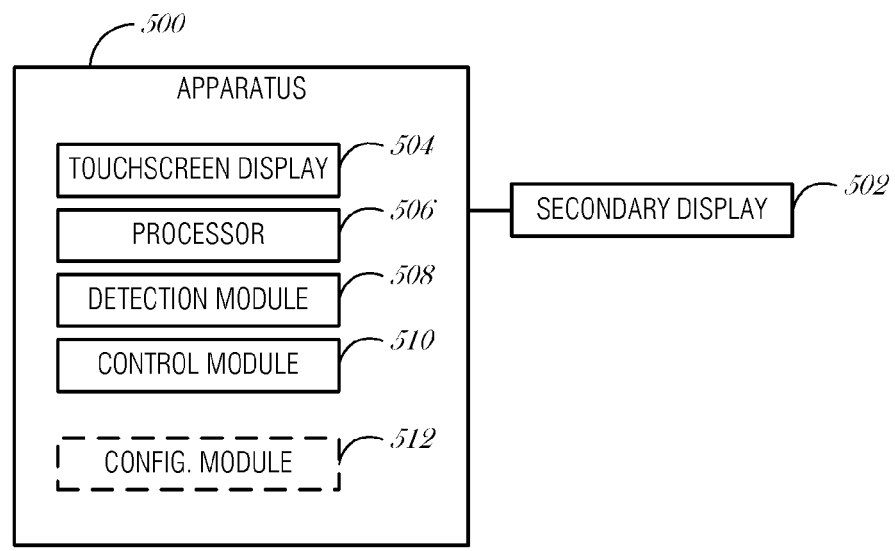
FIG. 5 is a block diagram illustrating an apparatus to control a secondary display, according to an example embodiment.

FIG. 5 is a block diagram illustrating an apparatus 500 to control a secondary display 502, according to an example embodiment. The apparatus 500 includes a touchscreen display 504, a processor 506, a detection module 508, and a control module 510. The processor 506, detection module 508, and control module 510 are communicatively coupled to one another. The processor 506 is communicatively coupled to the touchscreen display 504.

In an embodiment, the detection module detects a particular configuration of a plurality of contact points occurring concurrently on the touchscreen display and detects a touch interaction sequence after detecting the particular configuration of the plurality of contact points. A touch interaction sequence is a series of one or more concurrent touches and subsequent actions. The subsequent actions may be a drag (resulting in a touch-and-drag sequence), a hold (resulting in a touch-and-hold sequence), a tap (resulting in a single, double, or other sequence of taps), or the like. Touch-and-drag sequences may be used to magnify or shrink (e.g., a two-finger touch-and-drag sequence of pinching), rotate an image, or change applications. Touch-and-hold interaction sequences may be used to select or activate an object in a user interface, such as to cause a contextual menu or submenu to appear, select a folder or document icon, or activate a user interface element.

Figure 6:
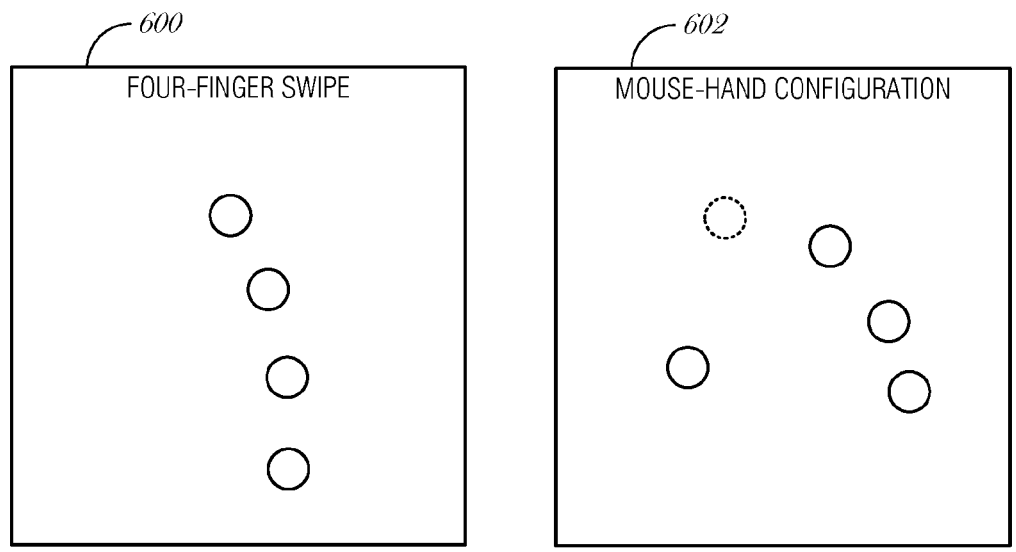
FIG. 6 is an example of contact points for a four-finger swipe and a mouse-hand configuration for illustration.

In an embodiment, the particular configuration of the plurality of contact points form a mouse-hand configuration. A mouse-hand configuration is an arrangement of contact points that resemble what would exist if a person where holding or handling a mouse input device. This may be distinguished from a four-finger swipe, which may be performed usually with the index, middle, ring, and pinky fingers, because a four-finger swipe contact pattern may be roughly linear or with a slight arc. In contrast, a mouse-hand configuration may have three contact points that are in a rough linear pattern or with a slight arc, and a fourth contact point that is separate in distance and alignment from the first three contact points. FIG. 6 is an example of contact points for a four-finger swipe 600 and a mouse-hand configuration 602 for illustration. As illustrated in FIG. 6, in an embodiment, the plurality of contact points for a mouse-hand configuration 602 is four contact points (with a fifth contact point optional). Other numbers of contact points may be used in the particular configuration, such as three. Additionally, a palm contact point may be used as a portion of the particular configuration (e.g., where a user rests her palm or a portion of the heel of the hand on the touchscreen while "mousing").

The control module controls a pointer on the secondary display based on the touch interaction sequence, the secondary display communicatively coupled to the apparatus.

In an embodiment, the apparatus 500 includes a configuration module 512 communicatively coupled to the processor, where the configuration module 512 enters a learning mode and configures the particular configuration of the plurality of contact points based on a user's hand position during the learning mode. For example, the user may use a configuration screen or other mechanism to assist the apparatus 500 in recognizing a mouse-hand configuration of the user. This may be useful especially when a user is left handed. The configuration process may include having the user place her hand on the touchscreen one or several times to identify the approximate pattern and alignment of contact points for the user's mouse-hand configuration.

The configuration module 512 may allow a user to configure the timeout delay before entering a control mode to control a secondary display. The timeout delay may be relatively short periods of time, such as 0.1, 0.2, or 0.5 seconds. The configuration module 512 may also be adaptable such that as the user uses the control mode to control the secondary display, the configuration module 512 is able to more quickly recognize the user's hand position and may then reduce or eliminate the timeout period before entering the control mode to control the secondary display.

In an embodiment, the detection module detects the touch interaction sequence by detecting a drag movement of the plurality of contact points. In such an embodiment, the control module 510 controls the pointer on the secondary display by moving a pointer on the secondary display. This may be performed by updating a pointer position in memory and sending a video signal to the secondary display 502 with the pointer in the new position. Alternatively, a mouse event may be transmitted to an application or an operating system that controls the presentation on the secondary display 502. Thus, in a further embodiment, moving the pointer on the secondary display includes transmitting a mouse move event to the secondary display 502.

In an embodiment, the detection module detects the touch interaction sequence by: detecting a new contact point in addition to the plurality of contact points and detecting a tapping motion at the new contact point. In such an embodiment, the control module 510 controls the pointer on the secondary display by selecting an object under the pointer at the secondary display. In a further embodiment, selecting the object under the pointer at the secondary display includes transmitting a mouse down event to the secondary display and transmitting a mouse up event to the secondary display.

In an embodiment, the detection module detects the touch interaction sequence by detecting a new contact point in addition to the plurality of contact points and detecting a swiping motion originating from the new contact point. In such an embodiment, the control module 510 controls the pointer on the secondary display includes scrolling a window in the secondary display. In a further embodiment, scrolling the window in the secondary display includes transmitting a mouse scroll event to the secondary display.

As described in FIGS. 3 and 4, the apparatus 500 and secondary display 502 may be communicatively connected using various physical or wireless connection mediums and protocols, such as HDMI, USB, Wi-Fi, or WiDi. Thus, in an embodiment, the apparatus 500 and the secondary display 502 are communicatively coupled over a wireless network connection. In a further embodiment, the wireless network connection is a wireless display connection.

Figure 7:
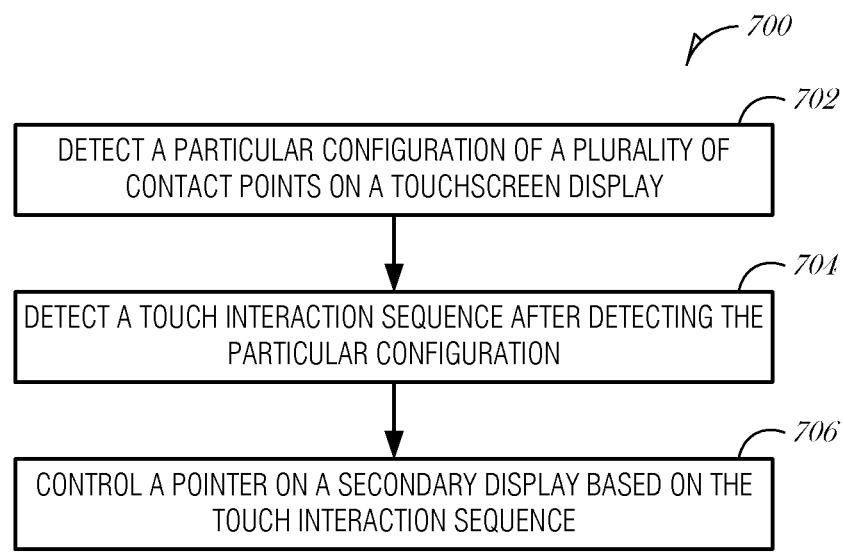
FIG. 7 is a flowchart illustrating a method for controlling a touchscreen display and a secondary display from the touchscreen display, according to an example embodiment.

FIG. 7 is a flowchart illustrating a method 700 for controlling a touchscreen display and a secondary display from the touchscreen display, according to an example embodiment. At block 702, a particular configuration of a plurality of contact points occurring concurrently on the touchscreen display is detected. At block 704, a touch interaction sequence is detected after detecting the particular configuration of the plurality of contact points. At block 706, a pointer is controlled on the secondary display based on the touch interaction sequence. In an embodiment, the particular configuration of the plurality of contact points form a mouse-hand configuration. In an embodiment, the plurality of contact points is four contact points.

In an embodiment, the method 700 includes entering a learning mode and configuring the particular configuration of the plurality of contact points based on a user's hand position during the learning mode.

In an embodiment, detecting the touch interaction sequence includes detecting a drag movement of the plurality of contact points and controlling the pointer on the secondary display includes moving a pointer on the secondary display. In a further embodiment, moving the pointer on the secondary display includes transmitting a mouse move event to the secondary display.

In an embodiment, detecting the touch interaction sequence includes: detecting a new contact point in addition to the plurality of contact points and detecting a tapping motion at the new contact point. In such an embodiment, controlling the pointer on the secondary display includes selecting an object under the pointer at the secondary display. In a further embodiment, selecting the object under the pointer at the secondary display includes transmitting a mouse down event to the secondary display and transmitting a mouse up event to the secondary display.

In an embodiment, detecting the touch interaction sequence includes detecting a new contact point in addition to the plurality of contact points and detecting a swiping motion originating from the new contact point. In such an embodiment, controlling the pointer on the secondary display includes scrolling a window in the secondary display.

In a further embodiment, scrolling the window in the secondary display includes transmitting a mouse scroll event to the secondary display.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
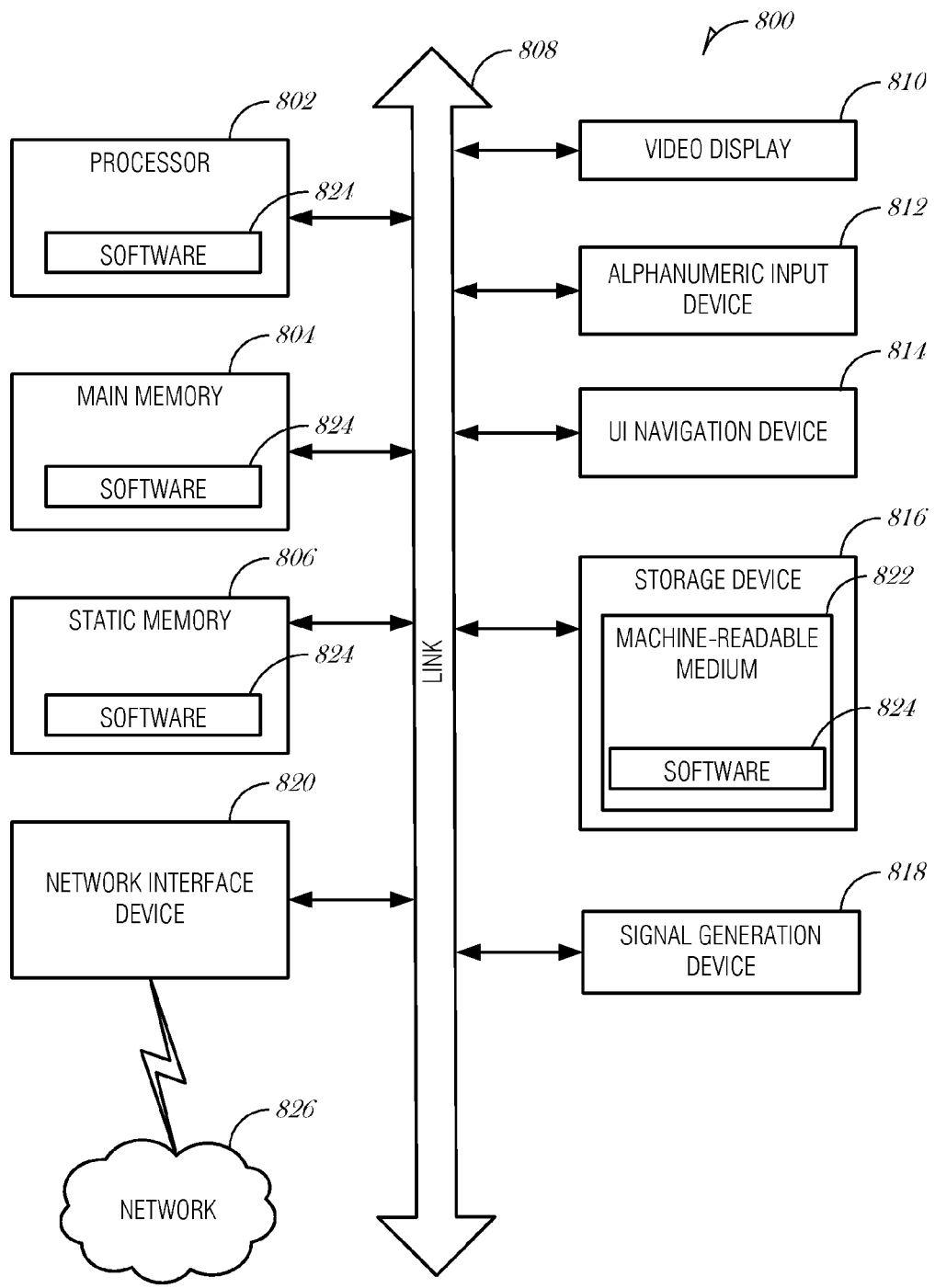
FIG. 8 is a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) comprising an apparatus to control primary and secondary displays from a single touchscreen, comprising: a touchscreen display; a processor communicatively coupled to the touchscreen display; a detection module communicatively coupled to the processor, the detection module to: detect a particular configuration of a plurality of contact points occurring concurrently on the touchscreen display; and detect a touch interaction sequence after detecting the particular configuration of the plurality of contact points; and a control module communicatively coupled to the processor, the control module to control a pointer on the secondary display based on the touch interaction sequence, the secondary display communicatively coupled to the apparatus.

Example 2, the subject matter of Example 1 may optionally include, a configuration module communicatively coupled to the processor, the configuration module to: enter a learning mode; and configure the particular configuration of the plurality of contact points based on a user's hand position during the learning mode.

In Example 3 the subject matter of any one or more of Examples 1 to 2 may optionally include, wherein the particular configuration of the plurality of contact points form a mouse-hand configuration.

In Example 4 the subject matter of any one or more of Examples 1 to 3 may optionally include, wherein the plurality of contact points is four contact points.

In Example 5 the subject matter of any one or more of Examples 1 to 4 may optionally include, wherein the detection module detects the touch interaction sequence by detecting a drag movement of the plurality of contact points; and wherein controlling the pointer on the secondary display includes moving a pointer on the secondary display.

In Example 6 the subject matter of any one or more of Examples 1 to 5 may optionally include, wherein detecting the drag movement includes detecting a mouse move event.

In Example 7 the subject matter of any one or more of Examples 1 to 6 may optionally include, wherein moving the pointer on the secondary display includes transmitting a mouse move event to the secondary display.

In Example 8 the subject matter of any one or more of Examples 1 to 7 may optionally include, wherein the detection module detects the touch interaction sequence by: detecting a new contact point in addition to the plurality of contact points; and detecting a tapping motion at the new contact point; and wherein controlling the pointer on the secondary display includes: selecting an object under the pointer at the secondary display.

In Example 9 the subject matter of any one or more of Examples 1 to 8 may optionally include, wherein detecting the tapping motion includes detecting a mouse down and mouse up event sequence.

In Example 10 the subject matter of any one or more of Examples 1 to 9 may optionally include, wherein selecting the object under the pointer at the secondary display includes: transmitting a mouse down event to the secondary display; and transmitting a mouse up event to the secondary display.

In Example 11 the subject matter of any one or more of Examples 1 to 10 may optionally include, wherein the detection module detects the touch interaction sequence by: detecting a new contact point in addition to the plurality of contact points; and detecting a swiping motion originating from the new contact point; and wherein controlling the pointer on the secondary display includes scrolling a window in the secondary display.

In Example 12 the subject matter of any one or more of Examples 1 to 11 may optionally include, wherein detecting the swiping motion includes detecting a mouse scroll event.

In Example 13 the subject matter of any one or more of Examples 1 to 12 may optionally include, wherein scrolling the window in the secondary display includes transmitting a mouse scroll event to the secondary display.

In Example 14 the subject matter of any one or more of Examples 1 to 13 may optionally include, wherein the apparatus and the secondary display are communicatively coupled over a wireless network connection.

In Example 15 the subject matter of any one or more of Examples 1 to 14 may optionally include, wherein the wireless network connection is a wireless display connection.

Example 16 includes or may optionally be combined with the subject matter of any one of Examples 1-15 to include subject matter for controlling a touchscreen display and a secondary display from the touchscreen display (such as a method, means for performing acts, machine readable medium including instructions that when performed by a machine cause the machine to performs acts, or an apparatus configured to perform) comprising: detecting a particular configuration of a plurality of contact points occurring concurrently on the touchscreen display; detecting a touch interaction sequence after detecting the particular configuration of the plurality of contact points; and controlling a pointer on the secondary display based on the touch interaction sequence.

In Example 17, the subject matter of Example 16 may optionally include, entering a learning mode; and configuring the particular configuration of the plurality of contact points based on a user's hand position during the learning mode.

In Example 18 the subject matter of any one or more of Examples 16 to 17 may optionally include, wherein the particular configuration of the plurality of contact points form a mouse-hand configuration.

In Example 19 the subject matter of any one or more of Examples 16 to 18 may optionally include, wherein the plurality of contact points is four contact points.

In Example 20 the subject matter of any one or more of Examples 16 to 19 may optionally include, wherein detecting the touch interaction sequence includes detecting a drag movement of the plurality of contact points; and wherein controlling the pointer on the secondary display includes moving a pointer on the secondary display.

In Example 21 the subject matter of any one or more of Examples 16 to 20 may optionally include, wherein detecting the drag movement includes detecting a mouse move event.

In Example 22 the subject matter of any one or more of Examples 16 to 21 may optionally include, wherein moving the pointer on the secondary display includes transmitting a mouse move event to the secondary display.

In Example 23 the subject matter of any one or more of Examples 16 to 22 may optionally include, wherein detecting the touch interaction sequence includes: detecting a new contact point in addition to the plurality of contact points; and detecting a tapping motion at the new contact point; and wherein controlling the pointer on the secondary display includes: selecting an object under the pointer at the secondary display.

In Example 24 the subject matter of any one or more of Examples 16 to 23 may optionally include, wherein detecting the tapping motion includes detecting a mouse down and mouse up event sequence.

In Example 25 the subject matter of any one or more of Examples 16 to 24 may optionally include, wherein selecting the object under the pointer at the secondary display includes: transmitting a mouse down event to the secondary display; and transmitting a mouse up event to the secondary display.

In Example 26 the subject matter of any one or more of Examples 16 to 25 may optionally include, wherein detecting the touch interaction sequence includes: detecting a new contact point in addition to the plurality of contact points; and detecting a swiping motion originating from the new contact point; and wherein controlling the pointer on the secondary display includes scrolling a window in the secondary display.

In Example 27 the subject matter of any one or more of Examples 16 to 26 may optionally include, wherein detecting the swiping motion includes detecting a mouse scroll event.

In Example 28 the subject matter of any one or more of Examples 16 to 27 may optionally include, wherein scrolling the window in the secondary display includes transmitting a mouse scroll event to the secondary display.

Example 29 includes or may optionally be combined with the subject matter of any one of Examples 1-28 to include a machine-readable medium including instructions for anomaly detection on a web client, which when executed by a machine, cause the machine to perform operations of any one of the examples 1-28.

Example 30 includes or may optionally be combined with the subject matter of any one of Examples 1-28 to include an apparatus comprising means for performing any of the examples 1-28.

Example 31 includes an apparatus for controlling a touchscreen display and a secondary display from the touchscreen display, the apparatus comprising: means for detecting a particular configuration of a plurality of contact points occurring concurrently on the touchscreen display; means for detecting a touch interaction sequence after detecting the particular configuration of the plurality of contact points; and means for controlling a pointer on the secondary display based on the touch interaction sequence.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus to control a secondary display, the apparatus comprising:
   a touchscreen display;
   a processor communicatively coupled to the touchscreen display;
   a detection module communicatively coupled to the processor, the detection module to:
   detect a particular configuration of a plurality of contact points occurring concurrently on the touchscreen display, the particular configuration forming a mouse-hand configuration of a single hand having contact points representing contact with a thumb and at least two additional fingers of the same hand; and
   detect a touch interaction sequence after detecting the particular configuration of the plurality of contact points, wherein the touch interaction sequence includes simultaneous motion of the plurality of contact points while maintaining the particular configuration;

a control module communicatively coupled to the processor, the control module to switch from a direct-control mode of controlling of the apparatus via the touchscreen display, to a remote-control mode of controlling a pointer on the secondary display based on the touch interaction sequence; and a configuration module communicatively coupled to the processor, the configuration module to:

enter a learning mode;

capture a user's hand position during the learning mode, the hand position engaging the plurality of contact points occurring concurrently on the touchscreen display; and configure the particular configuration of the plurality of contact points based on the user's hand position during the learning mode.

2. The apparatus of claim 1, wherein the control module is to control the pointer on the secondary display by at least transmitting a mouse move event to the secondary display.

3. The apparatus of claim 1, wherein the detection module detects the touch interaction sequence by:

detecting a new contact point in addition to the plurality of contact points; and detecting a tapping motion at the new contact point; and wherein controlling the pointer on the secondary display includes:

selecting an object under the pointer at the secondary display.

4. The apparatus of claim 3, wherein selecting the object under the pointer at the secondary display includes:

transmitting a mouse down event to the secondary display; and transmitting a mouse up event to the secondary display.

5. The apparatus of claim 1, wherein the detection module detects the touch interaction sequence by:

detecting a new contact point in addition to the plurality of contact points; and detecting a swiping motion originating from the new contact point; and wherein controlling the pointer on the secondary display includes scrolling a window in the secondary display.

6. The apparatus of claim 5, wherein scrolling the window in the secondary display includes transmitting a mouse scroll event to the secondary display.

7. The apparatus of claim 1, wherein the apparatus and the secondary display are communicatively coupled over a wireless network connection.

8. The apparatus of claim 7, wherein the wireless network connection is a wireless display connection.

9. A non-transitory machine-readable medium including instructions for controlling a touchscreen display and a secondary display from the touchscreen display, which when executed by a machine, cause the machine to perform operations comprising:

detecting a particular configuration of a plurality of contact points occurring concurrently on the touchscreen display, the particular configuration forming a mouse-hand configuration of a single hand having contact points representing contact with a thumb and at least two additional fingers of the same hand;

detecting a touch interaction sequence after detecting the particular configuration of the plurality of contact points, wherein the touch interaction sequence includes simultaneous motion of the plurality of contact points while maintaining the particular configuration; and switching from a direct-control mode of controlling of the machine via the touchscreen display, to a remote-control mode of controlling a pointer on the secondary display based on the touch interaction sequence;

entering a learning mode;

capturing a user's hand position during the learning mode, the hand position engaging the plurality of contact points occurring concurrently on the touchscreen display; and configuring the particular configuration of the plurality of contact points based on a user's hand position during the learning mode.

10. The non-transitory machine-readable medium of claim 9, wherein controlling the pointer on the secondary display includes transmitting a mouse move event to the secondary display.

11. The non-transitory machine-readable medium of claim 9, wherein detecting the touch interaction sequence includes:

detecting a new contact point in addition to the plurality of contact points; and detecting a tapping motion at the new contact point; and wherein controlling the pointer on the secondary display includes:

selecting an object under the pointer at the secondary display.

12. The non-transitory machine-readable medium of claim 11, wherein selecting the object under the pointer at the secondary display includes:

transmitting a mouse down event to the secondary display; and transmitting a mouse up event to the secondary display.

13. The non-transitory machine-readable medium of claim 9, wherein detecting the touch interaction sequence includes:

detecting a new contact point in addition to the plurality of contact points; and detecting a swiping motion originating from the new contact point; and wherein controlling the pointer on the secondary display includes scrolling a window in the secondary display.

14. A method for controlling a touchscreen display and a secondary display from the touchscreen display, the method comprising:

detecting a particular configuration of a plurality of contact points occurring concurrently on the touchscreen display, the particular configuration forming a mouse-hand configuration of a single hand having contact points representing contact with a thumb and at least two additional fingers of the same hand;

detecting a touch interaction sequence after detecting the particular configuration of the plurality of contact points, wherein the touch interaction sequence includes simultaneous motion of the plurality of contact points while maintaining the particular configuration; and switching from a direct-control mode of controlling of a device incorporating the touchscreen display, to a remote-control mode of controlling a pointer on the secondary display based on the touch interaction sequence;

entering a learning mode;

capturing a user's hand position during the learning mode, the hand position engaging the plurality of contact points occurring concurrently on the touchscreen display; and configuring the particular configuration of the plurality of contact points based on a user's hand position during the learning mode.

15. The method of claim 14, wherein detecting the touch interaction sequence includes:
    detecting a new contact point in addition to the plurality of contact points; and
    detecting a tapping motion at the new contact point; and
    wherein controlling the pointer on the secondary display includes:
        selecting an object under the pointer at the secondary display.

* * * * *